(12) United States Patent
Yang (10) Patent No.: US 10,443,561 B1
(45) Date of Patent: Oct. 15, 2019

(54) HYDROELECTRIC POWER GENERATION DEVICE FOR OPERATION WITH WATER FLOW OF SANITARY PIPING

(71) Applicant: Shun-Ming Yang, New Taipei (TW)

(72) Inventor: Shun-Ming Yang, New Taipei (TW)

( * ) Notice: Subject to any disclaimer, the term of this patent is extended or adjusted under 35 U.S.C. 154(b) by 0 days.

(21) Appl. No.: 15/980,696

(22) Filed: May 15, 2018

(51) Int. Cl.
```
F03B 11/04    (2006.01)
F03B 3/00     (2006.01)
F03B 3/12     (2006.01)
H02K 5/10     (2006.01)
H02K 11/00    (2016.01)
H02K 7/08     (2006.01)
H02K 7/18     (2006.01)
```

(52) U.S. Cl.
CPC ............... *F03B 3/128* (2013.01); *H02K 5/10* (2013.01); *H02K 7/085* (2013.01); *H02K 7/1823* (2013.01); *H02K 11/0094* (2013.01)

(58) Field of Classification Search
CPC ........ F03B 3/128; H02K 5/10; H02K 7/1823; H02K 7/085; H02K 11/0094
USPC .............................................. 290/43, 52, 54
See application file for complete search history.

(56) References Cited

U.S. PATENT DOCUMENTS

| | | | |
|---|---|---|---|
| 4,604,735 A * | 8/1986 | Parsons ................... | E03C 1/057 340/552 |
| 4,731,545 A * | 3/1988 | Lerner ................. | H02K 7/1823 290/43 |
| 5,043,592 A * | 8/1991 | Hochstrasser .......... | F03B 13/00 290/52 |
| 6,509,652 B2 * | 1/2003 | Yumita ................... | F03B 13/00 290/54 |
| 6,559,553 B2 * | 5/2003 | Yumita ..................... | F03B 3/00 290/43 |
| 6,765,308 B1 * | 7/2004 | Kazanjian ............... | F03B 13/00 290/43 |
| 6,768,218 B2 * | 7/2004 | Yumita ................... | F03B 13/00 290/43 |
| 6,876,100 B2 * | 4/2005 | Yumita ................... | F03B 13/00 290/43 |
| 7,005,758 B2 * | 2/2006 | Yumita ................... | F03B 13/00 290/43 |
| 7,253,536 B2 * | 8/2007 | Fujimoto .................. | E03D 3/00 290/43 |
| 7,690,623 B2 * | 4/2010 | Parsons ..................... | E03C 1/05 137/624.11 |

(Continued)

*Primary Examiner* — Tulsidas C Patel
*Assistant Examiner* — S. Mikailoff
(74) *Attorney, Agent, or Firm* — Leong C. Lei (57) ABSTRACT

A hydroelectric power generation device is structure to utilize water flowing to generate electrical power that could be supplied to a bathroom installation and is generally made up of a functional main body, a battery assembly, and a power generation module. The functional main body has two opposite sides each including a mounting end formed thereon. The functional main body forms therein a receiving chamber. The power generation module includes a stator and a rotor. The rotor is coupled, in a manner of being rotatable, to an axle, which is coupled to a vane wheel. Water flowing into the device drives the vane wheel and the rotor to rotate simultaneously so that magnetic interaction between the rotor and the stator generates electrical power that is supplied to a sensor controlling supply of water flow. A sleeve is fit over the axle for correcting and stably supporting the axle in rotation.

9 Claims, 6 Drawing Sheets

(56) References Cited

U.S. PATENT DOCUMENTS

| | | | | |
|---|---|---|---|---|
| 7,825,531 B2* | 11/2010 | Tanaka | ...................... | F03B 3/02 290/43 |
| 7,919,877 B2* | 4/2011 | Shimizu | ................ | E03C 1/0404 290/43 |
| 8,426,992 B2* | 4/2013 | Baarman | ................. | C02F 1/325 290/43 |
| 8,461,705 B2* | 6/2013 | Kuroishi | ................... | F03B 3/00 290/43 |
| 2003/0164612 A1* | 9/2003 | Yumita | ................... | F03B 13/00 290/1 R |
| 2004/0078878 A1* | 4/2004 | Gadtke | ..................... | E03C 1/12 4/218 |
| 2005/0006903 A1* | 1/2005 | Yumita | ................... | F03B 13/00 290/43 |
| 2006/0254947 A1* | 11/2006 | Rogers | .................... | B65D 1/14 206/509 |
| 2007/0246941 A1* | 10/2007 | Tanaka | ..................... | F03B 3/02 290/1 R |
| 2008/0217923 A1* | 9/2008 | Yen | ......................... | F03B 13/00 290/54 |
| 2008/0219831 A1* | 9/2008 | Yen | ......................... | F03B 13/00 415/1 |
| 2008/0231056 A1* | 9/2008 | Wen | ........................ | F03B 13/00 290/54 |
| 2008/0246282 A1* | 10/2008 | Hathaway | ............... | F03B 13/00 290/54 |
| 2009/0188995 A1* | 7/2009 | Onodera | ............... | E03C 1/0404 239/383 |
| 2011/0074157 A1* | 3/2011 | Kuroishi | ................... | F03B 3/00 290/52 |
| 2012/0086204 A1* | 4/2012 | Re | ........................... | F03B 13/00 290/43 |
| 2012/0235408 A1* | 9/2012 | Baarman | ................. | C02F 1/325 290/43 |
| 2014/0246099 A1* | 9/2014 | Herbert | ................... | E03C 1/057 137/78.1 |
| 2018/0062481 A1* | 3/2018 | Alexander | ........... | H02K 7/1823 |

* cited by examiner

HYDROELECTRIC POWER GENERATION DEVICE FOR OPERATION WITH WATER FLOW OF SANITARY PIPING

(A) TECHNICAL FIELD OF THE INVENTION

The present invention relates generally to an improved structure of a hydroelectric power generation device, and more particularly to a hydroelectric power generation device that comprises a sleeve for supporting and correcting a central position of an axle so as to keep the axle rotating at the central position, without undesired oscillation or wobbling, during the rotation of the hydroelectric power generation device, and also allowing the axle to be slightly elongated to improve the performance of power generation.

(B) DESCRIPTION OF THE PRIOR ART

Bathroom installations that are currently available, in addition to basic sanitary functions, are generally designed to meet specific requirements. Taking urinals as an example, the urinals are often provided with an auto-flush function, which is achieved with an infrared sensor that detects if a user is approaching or leaving the urinal. After the user has finished with urination, the infrared sensor detects if the user has left and starts flushing.

On the other hand, taking sensor faucets as an example, the sensor faucets are provided with an infrared sensor, which automatically opens the faucet to allow water to run out of the faucet when a user places hands approaching the sensor.

Such infrared sensors are often powered by electrical wires connected to a wall socket. The infrared sensors may be hidden in the bathroom installation with wires thereof being properly buried. However, the bathroom installations are often in a damp environment and it is generally difficult to ensure the electrical wires so connected or buried are free of electric leaking issues.

To cope with such problems, the present applicant has proposed, in Taiwan Utility Model M523762, a hydroelectric power generation device that involves a power generation module that is driven when a urinal is flushing or water is running out of a faucet in order to supply electrical power that is accumulated in a battery assembly.

Such a device is very popular in the market. However, the present inventor gets aware of certain shortcomings of such a device. In such a known device, the assembly is complicated because a large number of bushings are used to keep a central axle in a proper position. The bushings may also cause undesired oscillation during the operation of the power generation module.

The present invention aims to provide an improved structure that helps overcome the oscillation issue of the operation of the known hydroelectric power generation device.

SUMMARY OF THE INVENTION

The primary objective of the present invention is to overcome the issue of oscillation or wobble of the prior art devices during the operation thereof by providing a sleeve that functions for positional correction to keep an axle of a power generation module rotating at a central position so that stability of power generation by the power generation module could be kept even under variation of water flow.

The above objective is achieved with a structure that generally comprises:

a functional main body, which comprises a hollow casing structure, the functional main body being provided, on each of two opposite sides thereof, with a mounting end, the mounting end being formed with a through hole extending therethrough, the functional main body being formed with a hollow receiving chamber extending downward from a top thereof, a plurality of assembling sections being formed in the receiving chamber for engaging and retaining a power generation module;

the power generation module being arranged in the receiving chamber of the functional main body, the power generation module comprising a stator, a rotor, an axle assembly, and a vane wheel, the rotor being arranged in an interior of the stator, such that the rotor and the stator are rotatable relative to each other to induce a magnetic effect, the axle assembly comprising an axle, a bearing, and a sleeve, the axle having an end coupled to the rotor, the axle being fit, in sequence, through the bearing and the sleeve, the sleeve functioning to correct a central position of the axle, the vane wheel being mounted to an end of the axle that is opposite to the rotor such that the vane wheel corresponds, in position, to the through holes of the mounting ends; and a battery assembly, which is electrically connected to the power generation module, the battery assembly comprising a storage unit, such that electrical power generated by the power generation module is stored in the storage unit.

In an embodiment of the present invention, the end of the axle to which the vane wheel is mounted is provided with a coupling section, which receives a cap mounted thereto for position fixation after the vane wheel is fit over the axle.

In an embodiment of the present invention, the vane wheel comprises a vortex element coupled thereto for regulation of water flow.

In an embodiment of the present invention, a vortex element is provided in the through holes of the mounting ends.

In an embodiment of the present invention, the functional main body is formed with a threaded hole extending from a bottom thereof toward the receiving chamber, the threaded hole being combinable with a closure member, so that after the vane wheel is fit over the axle and is fastened in position by a cap, the closure member is secured under the cap to close the receiving chamber.

In an embodiment of the present invention, a correction compartment is formed in the assembling sections of the receiving chamber and the sleeve is arranged in the correction compartment for positional correction of the axle during rotation thereof.

With the structural arrangement described above, the present invention provides advantages that are brief described as follows. The axle of the power generation module of the present invention is supported by the bearing and the sleeve so as to correct the position of the axle in the rotation thereof, whereby the stability of the power generation module could be kept during the operation thereof. Further, one single sleeve is sufficient for correction of the axle, so that assembly does not necessarily go through a complicated process required in the prior art and thus product yield of the present invention could be increased so as to improve the advantageous position of product of the present invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
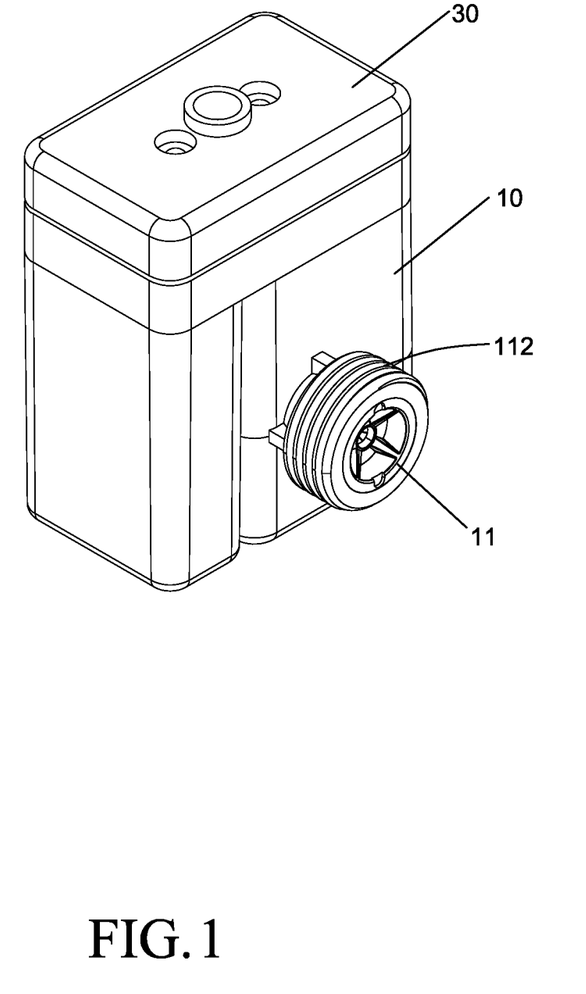
FIG. 1 is a perspective view of the present invention in an assembled form.
Figure 2:
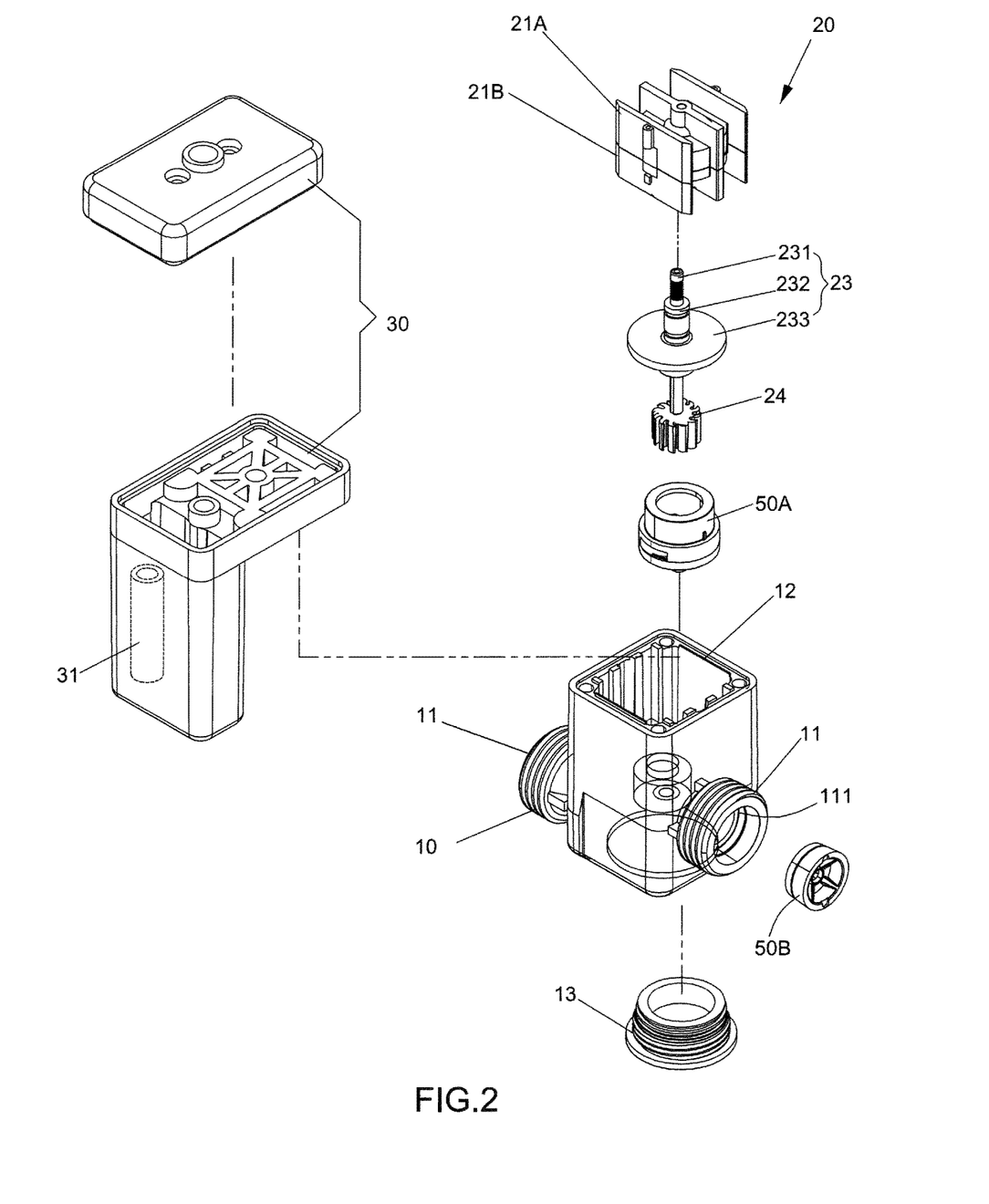
FIG. 2 is an exploded view of the present invention.
Figure 3:
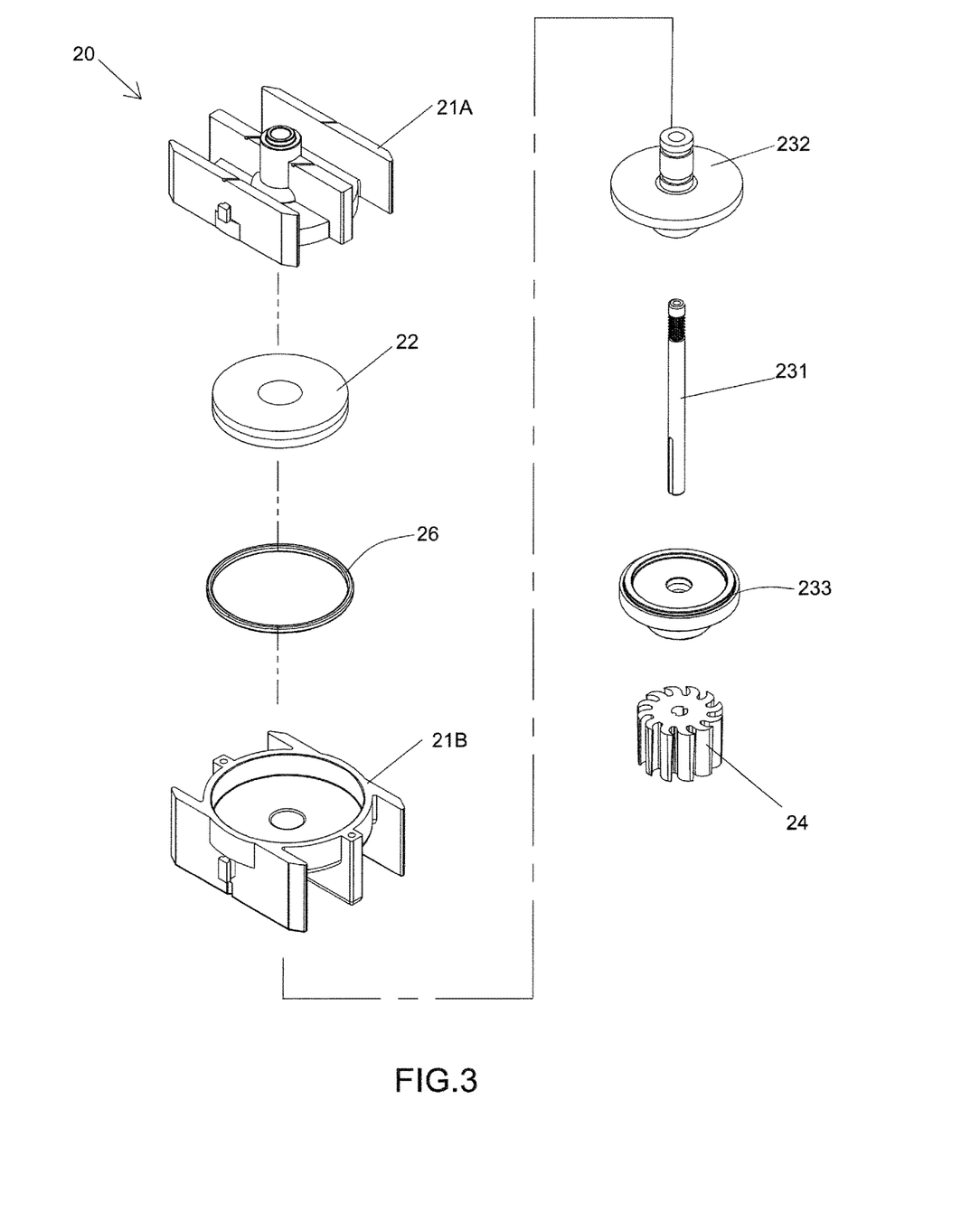
FIG. 3 is an exploded view, in an enlarged form, showing a power generation module.
Figure 4:
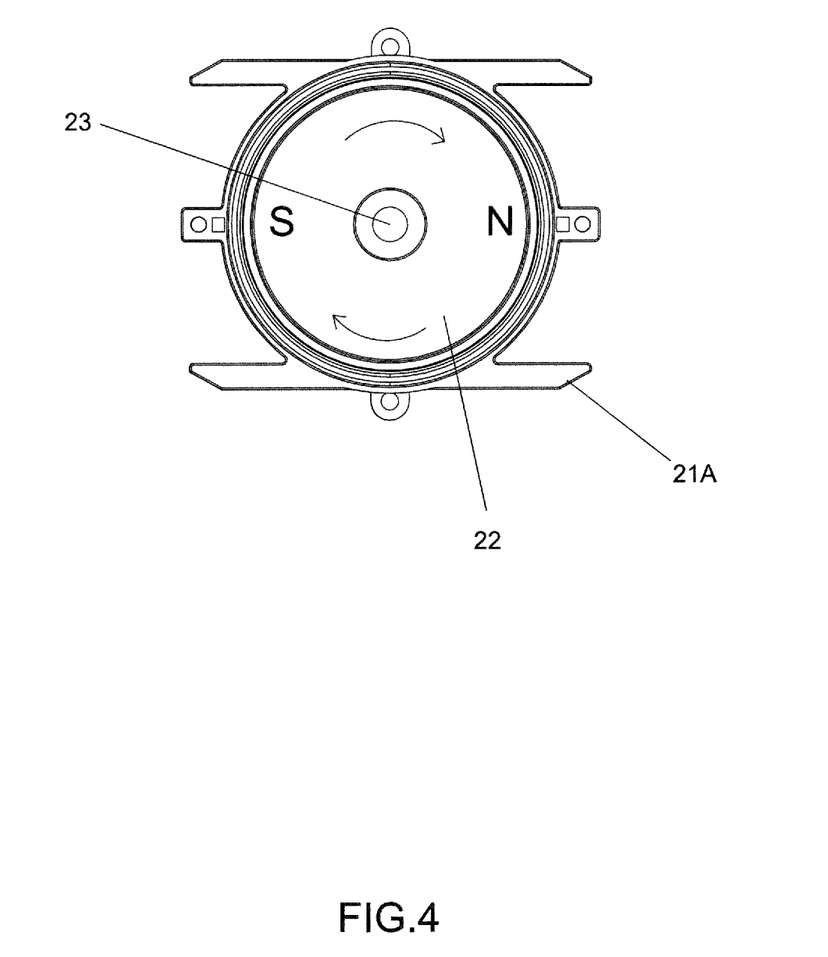
FIG. 4 is a schematic view illustrating power generation with a rotor and a stator.
Figure 5:
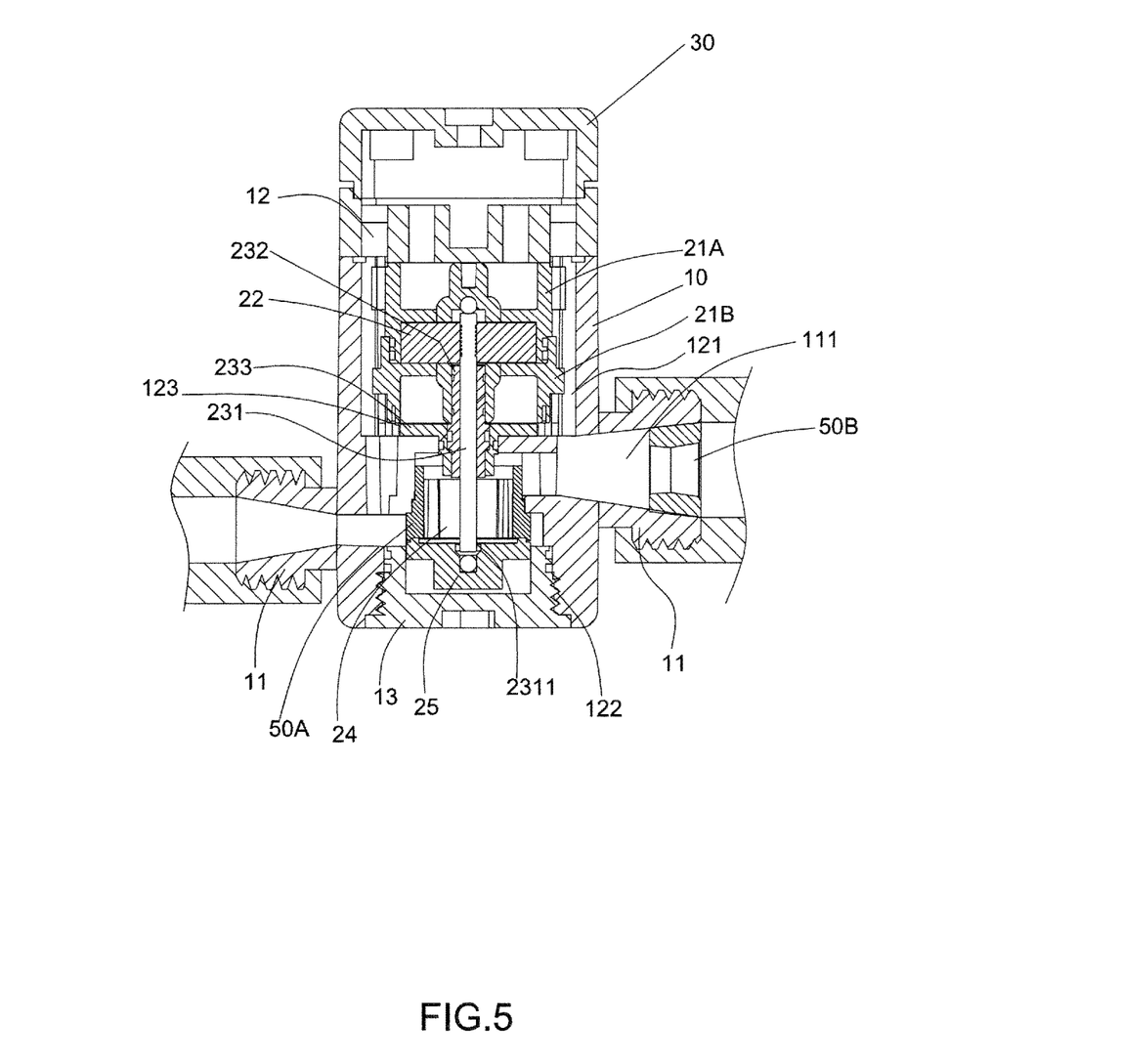
FIG. 5 is a schematic view, in a sectioned form, illustrating a condition of use of the present invention.
Figure 6:
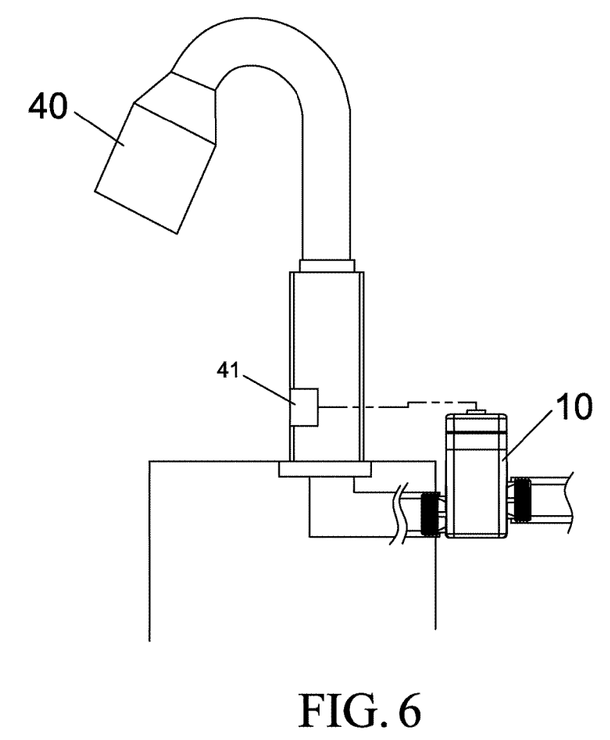
FIG. 6 is a schematic view illustrating a condition of use of the present invention.

Referring to FIGS. 1-6, an improved structure of a hydroelectric power generation device according to the present invention generally comprises: a functional main body 10, a power generation module 20, and a battery assembly 30.

Referring to FIGS. 1-6, the functional main body 10 comprises a hollow casing structure. In a preferred embodiment, the functional main body 10 is selectively made of a plastic material. The functional main body 10 is provided, on each of the two opposites sides thereof, with a mounting end 11. The mounting end 11 is formed with a through hole 111 extending therethrough. As shown in FIGS. 1-6, the mounting end 11 is provided with an externally-threaded section 112 for connection with a water conduit. The functional main body 10 is formed with a receiving chamber 12 that is hollow and extends downward from a top side. A plurality of assembling sections 121 are provided in the receiving chamber 12 for engaging and retaining the power generation module 20.

Referring to FIGS. 1-6, the power generation module 20 is mounted in the receiving chamber 12 of the functional main body 10. The power generation module 20 comprises a stator 21 that includes an upper part 21A and a lower part 21B combinable with each other, a rotor 22, an axle assembly 23, and a vane wheel 24. The rotor 22 is arranged in an interior space of the stator 21 defined between the upper and lower parts 21A, 21B such that a magnetic effect (which is a known technique to induce an action between north and south polarities of which feature description will not be provided) is induced when the rotor 22 and the stator 21 rotate relative to each other. The axle assembly 23 comprises an axle 231, a bearing 232, and a sleeve 233. The axle 231 has an end that is coupled to the rotor 22, and the axle 231 is fit, in sequence, through the bearing 232 and the sleeve 233. The sleeve 233 functions to set and/or correct a central position of the axle 231 by having a central hole thereof fit over the axle 231. The vane wheel 24 is mounted to an end of the rotor 22 that is opposite to the axle 231 such that the vane wheel 24 corresponds, in position, to the through holes 111 of the mounting ends 11. As such, water flows through the through holes 111 of the mounting ends 11 drives the vane wheel 24 to rotate so as to drive the axle 231 to cause rotation of the rotor 22 for generation of electric power through the magnetic effect. Further, a rubber seal ring 26 is provided between the stator 21 and the rotor to prevent water from flowing into the stator 21 and the rotor 22.

The battery assembly 30 is electrically connected to the power generation module 20. The battery assembly 30 comprises a storage unit 31, such that the electrical power generated by the power generation module 20 is accumulated and stored in the storage unit 31.

As such, use of the present invention as structured above will be described as follows. Firstly, the present invention is connected to a water passageway of a sensor-based bathroom installation 40 so that a sensor 41 of the bathroom installation 40, when detecting a human body is approaching, generates an electric signal to activate a water flow running out of the bathroom installation 40. When the water flow moves along a water pipe to enter, via the through holes 111 of the mounting ends 111, the receiving chamber 12, since the through holes 111 correspond, in position, to the vane wheel 24, the vane wheel 24 could be caused to rotate by the water flow. To ensure stability of the power generation module 20, in a preferred embodiment, a coupling section 2311 is provided on one end of the axle 231 that is coupled with the vane wheel 24 so that after the vane wheel 24 is fit over the axle 231, a cap 25 is mounted and fastened thereto for position fixation. The functional main body 10 is formed with a threaded hole 122 that extends from a bottom thereof toward the receiving chamber 12. The threaded hole 122 is mounted with a closure member 13, so that after the vane wheel 24 is fit over the axle 231 and fastened with the cap 25, the closure member 13 could be mounted under the cap 25 to close the receiving chamber 12 and prevent water from leaking from the receiving chamber 12. The sleeve 233 is received in a correction compartment 123 formed among the assembling sections 121 of the receiving chamber 12 in order to maintain the axle 231 in a stable condition without oscillation or wobble during the rotation thereof by means of the structural design of the functional main body 10 in combination with the sleeve 233. Since the axle 231 does not oscillate and wobble, the operations of the stator 21 and the rotor 22 coupled thereto can be kept stable so that the electrical power generated thereby could be fed to and stored in the storage unit 31 of the battery assembly 30. Further, the battery assembly 30 can be arranged to supply electrical power to the sensor 41 of the bathroom installation 40 so that, as a whole, the present invention causes virtually no loss of electrical power. Further, the present invention is structured with one single axle 231 so that the bearing 232 and the sleeve 233 could effectively correct the central position of the axle 231, whereby the complication of assembly could be reduced and the accuracy of the axle assembly 23 could be enhanced, these being product advantages that could not be achieved with the prior art devices.

It is noted that a vortex generation element 50A could be selectively installed in the through holes 111 of the mounting ends 11 or a vortex generation element 50B could be selectively installed around the vane wheel 24 so that adjusting the position of the vortex element 50A or 50B (namely tightness) allows for variation or adjustment or regulation of electrical power generated by this invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A hydroelectric power generation device, comprising:
   a functional main body, which comprises a hollow casing structure, the functional main body having two opposite sides, each of the two opposite sides being provided with a mounting end that is formed with a through hole extending therethrough and is adapted to connect to a water conduit, the functional main body being formed with a hollow receiving chamber extending downward from a top thereof;
   a plurality of assembling sections, which are formed in the receiving chamber;
   a power generation module, which is arranged in the receiving chamber of the functional main body and is retained in position by the plurality of assembling sections, the power generation module comprising:
   a stator,
   a rotor, arranged in an interior of the stator, such that the rotor and the stator are rotatable relative to each other to induce a magnetic effect,
   an axle assembly comprising an axle, the axle having a first end coupled to the rotor and fit, in sequence, through a bearing and a sleeve retained in the receiving chamber, so that the sleeve keeps a central portion of the axle in position, and
   a vane wheel, which is mounted to a second end of the axle, the second end of the axle being opposite to the first end of the axle, wherein the first end of the axle is coupled to the rotor in such a way that the vane wheel corresponds, in position, to the through holes of the mounting ends; and
   a battery assembly, which is electrically connected to the power generation module, the battery assembly comprising a storage unit, such that electrical power generated by the power generation module is stored in the storage unit;
   wherein a water flow passing through the water conduits is conducted through the receiving chamber such that the water flow drives the vane wheel of the power generation module to rotate and thus generate the electrical power; and
   wherein the first end of the axle is coupled to the rotor to form an upper support point of the axle; the second end of the axle is supported by a part of the functional main body at a location opposite to the rotor so as to form a lower support point of the axle; and the central portion of the axle that is spaced from the first end and the second end of the axle and is supported by the sleeve via the bearing to form a third support point of the axle, so that a three-point supporting arrangement is provided for supporting the axle at three different locations.

2. The hydroelectric power generation device according to claim 1, wherein the second end of the axle to which the vane wheel is mounted is provided with a coupling section, which receives a cap mounted thereto for position fixation after the vane wheel is fit over the axle.

3. The hydroelectric power generation device according to claim 1, wherein the vane wheel comprises a vortex element coupled thereto for regulation of water flow.

4. The hydroelectric power generation device according to claim 1, wherein the functional main body is formed with a threaded hole extending from a bottom thereof toward the receiving chamber, the threaded hole being combinable with a closure member, so that after the vane wheel is fit over the axle and is fastened in position by a cap, the closure member is secured under the cap to close the receiving chamber.

5. The hydroelectric power generation device according to claim 1, wherein a vortex element is provided in at least one of the through holes of the mounting ends.

6. The hydroelectric power generation device according to claim 1, wherein a correction compartment is formed in the assembling sections of the receiving chamber and the sleeve is arranged in the correction compartment for positional correction of the axle during rotation thereof.

7. The hydroelectric power generation device according to claim 1, wherein the battery assembly is connectable to a sensor of a bathroom installation for supplying electrical power to the sensor.

8. The hydroelectric power generation device according to claim 1, wherein the functional main body is formed of a plastic material.

9. The hydroelectric power generation device according to claim 1, wherein the mounting ends are provided with an externally-threaded section for connection with the water conduit.

* * * * *